(12) United States Patent
Suzuki

(10) Patent No.: US 9,398,245 B2
(45) Date of Patent: Jul. 19, 2016

(54) DISPLAY DEVICE

(75) Inventor: Hiroto Suzuki, Osaka (JP)

(73) Assignee: SHARP KABUSHIKI KAISHA, Osaka (JP)

( * ) Notice: Subject to any disclaimer, the term of this patent is extended or adjusted under 35 U.S.C. 154(b) by 0 days.

(21) Appl. No.: 14/369,655

(22) PCT Filed: Sep. 14, 2012

(86) PCT No.: PCT/JP2012/073600
§ 371 (c)(1),
(2), (4) Date: Jun. 27, 2014

(87) PCT Pub. No.: WO2013/099369
PCT Pub. Date: Jul. 4, 2013

(65) Prior Publication Data
US 2014/0362295 A1    Dec. 11, 2014

(30) Foreign Application Priority Data

Dec. 28, 2011  (JP) .................................. 2011-288526

(51) Int. Cl.
*H04N 5/45*  (2011.01)
*H04N 5/445*  (2011.01)
*G09G 5/00*  (2006.01)

(52) U.S. Cl.
CPC ........... *H04N 5/44591* (2013.01); *G09G 5/003* (2013.01); *G09G 2330/08* (2013.01); *G09G 2330/12* (2013.01); *G09G 2370/12* (2013.01); *H04N 2005/44517* (2013.01)

(58) Field of Classification Search
CPC ....................................... H04N 5/45
USPC ................................................ 348/564, 569
See application file for complete search history.

(56) References Cited

U.S. PATENT DOCUMENTS

2011/0134326 A1*  6/2011  Nakayama ......... H04N 21/4104
348/569

FOREIGN PATENT DOCUMENTS

| JP | 5-161084 A | 6/1993 |
| JP | 9-292868 A | 11/1997 |
| JP | 2008-281717 A | 11/2008 |
| JP | 2011-87254 A | 4/2011 |

* cited by examiner

*Primary Examiner* — Michael Lee
*Assistant Examiner* — Sihar Karwan
(74) *Attorney, Agent, or Firm* — Birch, Stewart, Kolasch & Birch, LLP

(57) ABSTRACT

In order to enable cables to be easily and correctly connected in a display device requiring a plurality of cables to be connected to source device, even if cables having the same appearance are used, the display device (100) is provided with one display panel (10) and a plurality of input terminals, and is able to be connected via a plurality of cables to source device (101), which outputs a video signal for a video to be displayed on the display panel (10). The display device (100) includes an on-screen display (OSD) processing portion. When a plurality of video signals, which show a test image having different colors in split display areas formed by splitting a display area of the display panel (10) so as to have the same number as the number of cables, are received from the source device (101) via the plurality of cables, an OSD image that prompts a user to switch the cables is displayed on the display panel (10) according to the received test image.

6 Claims, 6 Drawing Sheets

# DISPLAY DEVICE

TECHNICAL FIELD

The present invention relates to a display device, and more specifically to a display device which is provided with a display panel and capable of video input from a cable.

BACKGROUND OF THE INVENTION

Currently, as a display device, so-called HD (High Definition) with a pixel number of 1920×1080 has been mainstream. On the other hand, there has been also growing demand for a higher-definition display device, and a television device for displaying a 4K2K video and an ultrahigh-definition video having a pixel number which is sixteen times of the HD (7680×4320 pixels) has been also increasingly developed. Note that, 4K2K refers to 4K (4096×2160 pixels) which is defined by a standard specification of digital cinema and QFHD (Quad Full High Definition) having a pixel number which is four times of the HD (3840×2160 pixels).

Moreover, when being connecting to external source device with an HDMI (High-Definition Multimedia Interface) (registered trademark) cable, the display device is able to input a video signal from the source device for displaying. However, the current HDMI specification is premised on displaying a video with resolution which is basically not more than the HD. More specifically, it is impossible in the HDMI version 1.4 which is the latest HDMI specification to transmit and reproduce an ultrahigh-definition video with one HDMI cable. Moreover, the HDMI version 1.4 is compatible with a format of 3840×2160 pixels and 30 Hz/25 Hz/24 Hz or a format of 4096×2160 pixels and 24 Hz, but not with 60 Hz, as to a 4K2K video. Accordingly, when a 4K2K video is set, for example, in a personal computer (PC) or the like to try to reproduce a video with 60 Hz in a window by using one HDMI cable, frame omission occurs and smoothness is lacking.

In this manner, it is basically impossible to read a 4K2K or ultrahigh-definition video from source device using one HDMI cable for reproducing, and connection with a plurality of HDMI cables becomes necessary for such reproduction. For example, a display device that displays a 4K2K video requires four HDMI cables and a display device that displays an ultrahigh-definition video requires sixteen HDMI cables, so that a higher-definition display device requires the extremely increased number of HDMI cables for connection. In addition, a display device capable of multi-screen display by a plurality of video signals from a plurality of source device also requires the extremely increased number of HDMI cables for connection.

Here, if HDMI cables are not connected correctly, a video that a part or all of videos to be displayed in split display areas are exchanged, that is, a video that a part or all of a display screen is deviated is to be displayed, so that it is necessary to be very careful such as by performing connection while perusing an instruction manual. Of course, if a specification for a higher-speed cable is established, such a problem is solved, but connection with an HDMI cable is a key for the meantime.

Patent Document 1 discloses a display system that connects a plurality of displays so as to show like a single high-resolution display. In this display system, the plurality of displays are connected to a display sharing box, a dedicated board is plugged in a PC main body, and the display sharing box is connected thereto. Then, the dedicated board shows the plurality of displays to an OS (Operating System) of the PC main body as if being a single display as well as notifies the display sharing box of information from the OS, and the display sharing box judges on which display the information of the OS is to be displayed and provides each display with data.

PRIOR ART DOCUMENT

Patent Documents

Patent Document 1: Japanese Laid-Open Patent Publication No. H9-292868

SUMMARY OF THE INVENTION

Problem to be Solved by the Invention

As described above, in the conventional technology, when the required number of HDMI cables for connection with source device is plural, if the HDMI cables are not connected correctly, a video that a part or all of a display screen is deviated is to be displayed, so that it is necessary to be very careful for the connection.

Of course, when the number of HDMI cables is relatively small, such as four, the HDMI cables are able to be connected and switched while seeing a displayed video, thus providing correct connection. However, even when the number of cables is relatively small, erroneous connection may be performed successively if a user performs switching randomly without any suggestion, thus requiring labor. Further, when the number of HDMI cables is relatively large, such as sixteen, too much labor is taken, so that improvement for differentiating appearances becomes essential such as by differentiating shapes of the HDMI cables, assigning numbers to connectors, or differentiating colors of the connectors.

Moreover, the technology described in Patent Document 1 premises that the plurality of displays are connected to the display sharing box correctly, and in the case of erroneous connection, a similar problem is caused. Further, the technology described in Patent Document 1 is not related to connection of HDMI connectors.

Further, not only connection with HDMI cables but also connection with cables of other specification may also similarly cause the problem as described above.

The present invention has been made in view of circumstances as described above, and an object thereof is, in a display device requiring a plurality of cables to be connected to source device, to enable the cables to be easily and correctly connected, even if the cables having a same appearance are used.

Means for Solving the Problem

To solve the above problems, a first technical means of the present invention is a display device that includes one display panel and a plurality of input terminals for inputting a video signal for a video to be displayed on the display panel by dividing into a plurality of cables, and is able to be connected to source device for outputting the video signal of the video to be displayed on the display panel with the plurality of cables, wherein the display device includes an OSD processing portion that, when receiving a plurality of video signals, which show a test image having different colors respectively in split display areas formed by splitting a display area of the display panel so as to have the same number as the number of the cables, from the source device via each of the plurality of cables, causes the display panel to display an OSD image that prompts a user to switch the cables according to the received test image.

A second technical means is the display device of the first technical means, wherein a detection portion that detects a color of the test image for each of the video signals received via the plurality of cables from the source device is included, and the OSD processing portion displays, as the OSD image, a guide image that prompts the user to switch the cables in such a manner that each color detected by the detection portion has predetermined arrangement with respect to the received test image.

A third technical means is the display device of the first technical means, wherein the OSD processing portion displays, as the OSD image, an image that has a color indicated by predetermined arrangement and is smaller than the split display area in each of the split display areas, and a guide image that prompts the user to switch the cables so that a color of the test image and a color of the small image, which are displayed in each of the split display areas, are matched.

A fourth technical means is the display device of any one of the first to the third technical means, wherein the cables are HDMI cables and the input terminals are HDMI input terminals.

Effect of the Invention

According to the present invention, in a display device requiring a plurality of cables to be connected to source device, it is enabled to connect the cables easily and correctly, even if the cables having a same appearance are used.

PREFERRED EMBODIMENT OF THE INVENTION

Though description will hereinafter be given for a system that displays a 4K2K video output from source device on a display device with reference to diagrams, a system provided with a display device that displays an ultrahigh-definition video or the like or a display device corresponding to multi-screen display is also able to be described in the same manner basically, which is nothing more than that the required number of cables is different and processing is changed accordingly. For example, when a 4K2K video is input from two source device and displayed on dual screens, eight HDMI cables are required. Moreover, since the present invention is most useful for connection with an HDMI specification under the present circumstances, description will be given below premising on the HDMI specification, which is applicable in the same manner even to other specifications. Further, though audio output will not be described in particular in the following description, an audio signal is associated with a video signal and input to a display device side and audio output is performed in a state of being synchronized with the video signal.

Figure 1:
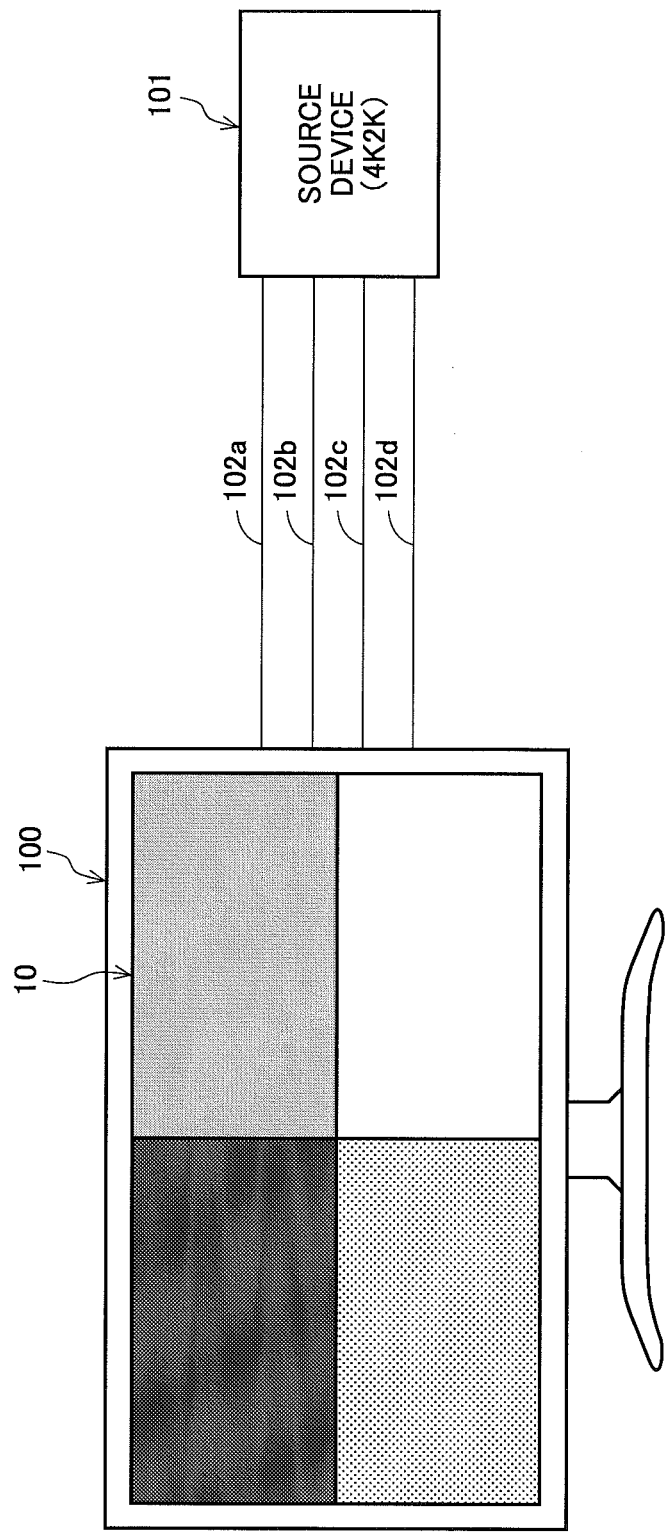
FIG. 1 is a diagram showing an example of a connection form of a display device according to the present invention.

FIG. 1 is a diagram showing an example of a connection form of a display device according to the present invention.

A display device 100 according to the present invention is provided with one display panel 10, and a plurality of HDMI input terminals for inputting a video signal for a video to be displayed on the display panel 10 by dividing into a plurality of HDMI cables (a plurality of HDMI input terminals for connecting each of the plurality of HDMI cables). Further, the display device 100 is able to be connected to source device 101 which outputs the video signal for the video to be displayed on the display panel 10 with the plurality of HDMI cables. That is, the display device 100 is a device which receives the video signal for the video to be displayed on one display panel 10 from the source device 101 by dividing into the plurality of HDMI cables. For example, recorder device, disc reproducing device, a PC or the like corresponds to the source device 101.

In this example, since it is assumed that a 4K2K video is displayed on a single screen, four HDMI cables 102a to 102d are able to be adopted as the above-described plurality of HDMI cables. Moreover, in each of the above-described plurality of HDMI cables, video signals of a split video that the video to be displayed on a screen of the display panel 10 is evenly split basically (split into four in the example of FIG. 1) are transmitted in parallel.

Further, the display device 100 is provided with an OSD (On Screen Display) processing portion as follows, as a main feature thereof. When a plurality of video signals, which show a test image (test pattern image) having different colors respectively in split display areas (in this example, four split display areas) formed by splitting a display area of the display panel 10 in such a manner that the number is the same as the number of the HDMI cables 102a to 102d, are received from the source device 101 via the four HDMI cables 102a to 102d, this OSD processing portion causes the display panel 10 to display an OSD image described below (in a superimposed manner).

Therefore, the source device 101 needs to send a video signal for displaying the test image having different colors respectively in the split display areas as the video signal for the 4K2K video which is sent via the four HDMI cables 102a to 102d. This video signal refers to a signal of test images in which four quarter videos which are sent via each of the four HDMI cables 102a to 102d all have different colors.

Moreover, the OSD image to be displayed by processing at the OSD processing portion is an OSD image that prompts a user to switch the HDMI cables 102a to 102d (at HDMI input terminals or HDMI output terminals on the source device side) according to the received test images. That is, the OSD processing portion performs OSD display of a guide screen for switching the HDMI cables 102a to 102d according to the test images input from four HDMI input terminals.

Note that, a method for switching the HDMI cables 102a to 102d includes switching at the HDMI input terminals and switching at the HDMI output terminals on the source device side, and any method may be prompted. However, in the following description, for simplicity, description will be given by taking an example of prompting a user to switch at the HDMI input terminals.

Figure 2:
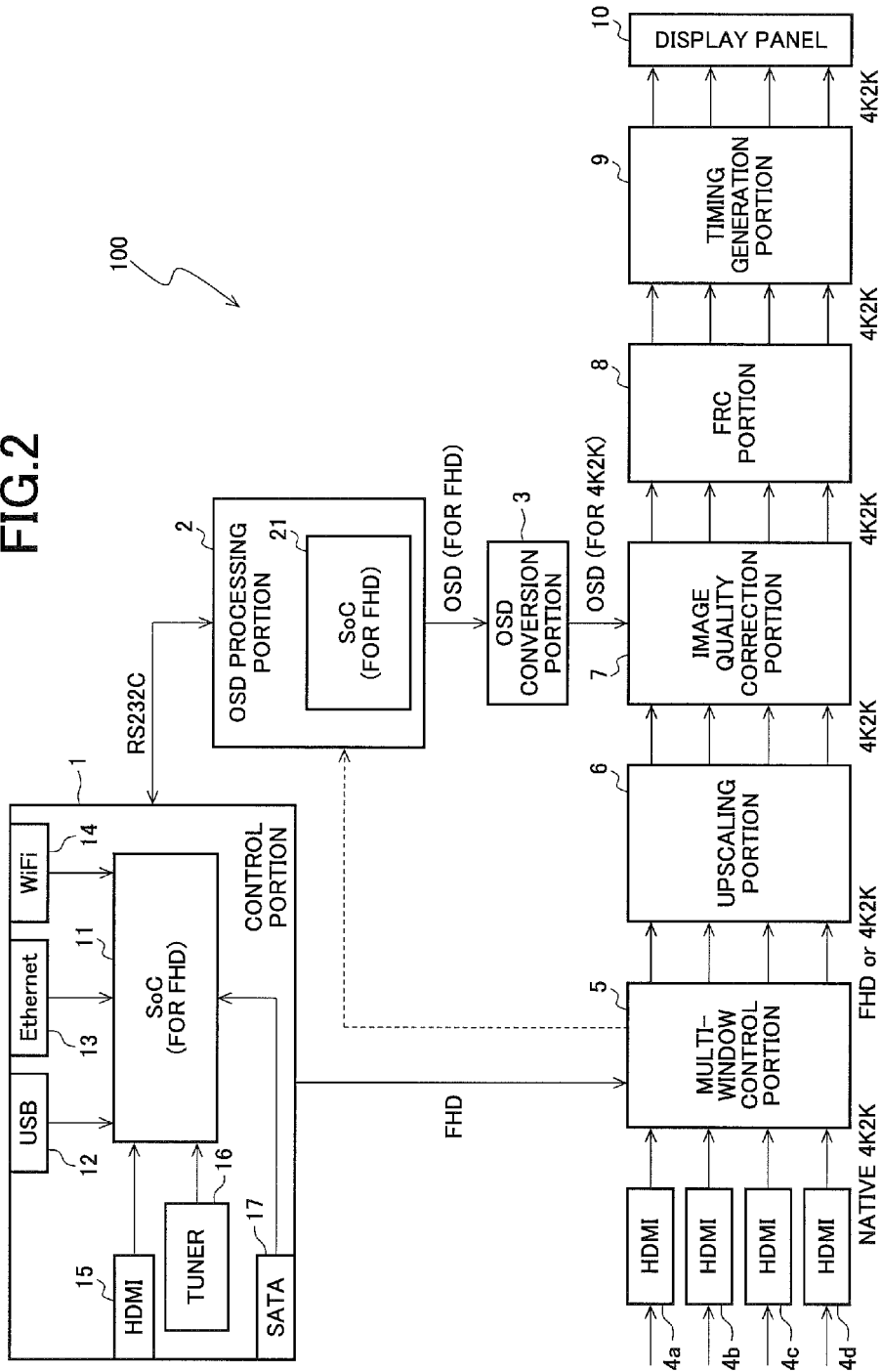
FIG. 2 is a functional block diagram showing an exemplary configuration of the display device according to the present invention.

Description will be given below for an exemplary configuration of the display device 100 with reference to FIG. 2 and the like in combination. FIG. 2 is a functional block diagram showing an exemplary configuration of the display device according to the present invention, and each function is configured by one or more LSI (Large Scale Integrated Circuit) and FPGA (Field Programmable Gate Array). Note that, an example using SoC (System on a Chip) is taken below, but without limitation thereto, for example, SiP (System In Package) may be used instead.

The display device 100 exemplified in FIG. 2 is provided with, in addition to the display panel 10 that displays a 4K2K video, a control portion 1, an OSD processing portion 2, an OSD conversion portion 3, four HDMI input terminals 4a to 4d, a multi-window control portion 5, an upscaling portion 6, an image quality correction portion 7, an FRC (Frame Rate Control) portion 8, and a timing generation portion 9.

The control portion 1 has a main SoC 11, and is provided with a USB (Universal Serial Bus) terminal 12 for connecting a USB cable, an Ethernet (registered trademark) connection terminal 13 for LAN connection, WiFi (registered trademark) communication device 14 for performing communication with WiFi compatible device, an HDMI input terminal 15, a tuner 16 which receives and demodulates broadcast wave, and an SATA (Serial AT Attachment) interface 17, and the like, as video input interfaces.

The SATA interface 17 is an example of an interface for connecting a portable recording medium reading device (not shown) such as a BD (Blu-ray Disc) or a DVD (Digital Versatile Disc). The HDMI input terminal 15 is a terminal for inputting a full HD (FHD) video from the HDMI cable, separately from the four HDMI input terminals 4a to 4d for 4K2K. It is preferable that the HDMI input terminals 4a to 4d and the HDMI input terminal 15 are able to send/receive not only a CEC (Consumer Electronics Control) message but also an HEC (HDMI Ethernet Channel) message of the HDMI specification, that is, compatible with a version after HDMI version 1.4. Note that, the CEC message is able to include various vendor commands.

The control portion 1 performs processing for inputting an FHD video signal from any of the video input interfaces in accordance with an operation signal, default video input setting (such as a video which has been input before turning power off previously) and the like to output to the multi-window control portion 5, mainly by the SoC 11. Note that, the operation signal corresponds to an operation signal received at an operation portion provided in a main body of the display device 100, which is not shown, or an operation signal received from a remote controller for the display device 100.

The OSD processing portion 2 has a sub SoC 21 and generates an OSD image for FHD. For generation itself of the OSD image, a known technology may be used such as using characters and graphics stored in a not-shown memory. The OSD processing portion 2 is able to communicate with the control portion 1 by a serial communication system, for example, pursuant to specifications of so-called RS232C and a revised version thereof, and is controlled by the SoC 11 of the control portion 1. Note that, any one or more of video input interfaces may be configured to be connected to an SoC 21 side to perform video input under control of the SoC 21 and send a video signal to the multi-window control portion 5 under control of the SoC 11 via the RS232C. Moreover, the SoC 21 may be configured to be responsible for entire control concerning a 4K2K video.

As a main feature of the present invention particularly, as described above, when receiving a plurality of video signals indicating the above-described test images from the source device 101 via the four HDMI cables 102a to 102d, respectively, the OSD processing portion 2 causes the display panel 10 to display the OSD image that prompts a user to switch the HDMI cables 102a to 102d according to the received test images.

The OSD conversion portion 3 converts the FHD OSD image output from the SoC 21 to send to the image quality correction portion 7. As a method for converting the OSD image, the FHD OSD image is scaled to be converted into an OSD image for 4K2K, or a quarter of the 4K2K image is sent four times, which is memorized to be converted into a 4K2K OSD image. Note that, though the OSD conversion portion 3 is provided separately from the OSD processing portion 2, it may be configured so that, without providing the OSD conversion portion 3, an OSD image for 4K2K is generated in the OSD processing portion 2 from the beginning to be output to the image quality correction portion 7.

The four HDMI input terminals 4a to 4D are HDMI input terminals for connecting the four HDMI cables (cables 102a to 102d of FIG. 1), respectively, and may be provided only by the number corresponding to the number of the HDMI cables as exemplified in FIG. 2. Note that, each of the HDMI input terminals 4a to 4d includes not only an HDMI receiver for video input but a CEC interface, or a CEC interface and a LAN interface and the like, which may be provided separately. Further, each of the HDMI input terminals 4a to 4d is connected to a terminal of a display element group of the split display area in the display panel 10. The HDMI input terminal and this terminal of the display element group correspond to each other one on one. That is, this terminal of the display element group is provided only by the number corresponding to the number of the HDMI cables which perform split video input (the number of the HDMI input terminals 4a to 4d), and it is four in this example.

The multi-window control portion 5 is able to input FHD videos from the control portion 1 and input native 4K2K videos from the HDMI input terminals 4a to 4d, and performs multi-window synthesizing processing (synthesizing processing for multi-screen display) of a plurality of FHD videos and 4K2K videos in accordance with operation signals and default video input setting as well as performs synchronization of video signals corresponding to each window. Thus, the multi-window control portion 5 also performs control for synthesizing multi-windows by video input from the plurality of video input interfaces in the control portion 1 to constitute one FHD video (or control for constituting a 4K2K video from four FHD videos) and control for synthesizing quarter videos for 4K2K input from the HDMI input terminals 4a to 4d in parallel to constitute a 4K2K video. Moreover, the multi-window control portion 5 is also able to output one FHD video from the control portion 1 to a next stage without performing the multi-window synthesizing processing.

The upscaling portion 6 performs upscaling for display on the display panel 10 for 4K2K with respect to the FHD videos output from the multi-window control portion 5 to output to a next stage. When a 4K2K video is output from the multi-window control portion 5, the upscaling portion 6 may output it to a next stage without performing processing.

The image quality correction portion 7 performs correction or the like for the 4K2K video input from the upscaling portion 6 according to gamma and user adjustment, and also performs superimposing of the OSD image output from the OSD conversion portion 3. Note that, correction may be applied to the video after superimposed with the OSD image at the image quality correction portion 7.

The FRC portion 8 converts a video frame output from the image quality correction portion 7 to have a k-time-speed to output to the timing generation portion 9. Here, K is not limited to a positive integer and may be a positive actual number. Of course, the FRC portion 8 may not be provided and the video frame as it is, which is output from the image quality correction portion 7, may be output to the timing generation portion 9. The timing generation portion 9 is a block that generates a pulse for taking a timing for the display panel 10 for 4K2K, which is a so-called TCON (Timing Controller). The display panel 10 displays the 4K2K video in accordance with this pulse. As the display panel 10, a panel configured by a display element such as liquid crystal or an organic EL is usable, but there is no limitation thereto.

Description will be given below for various examples of OSD processing mainly executed by the OSD processing portion 2 in the display device 100, with reference to FIG. 3 to FIG. 5.

First, description will be given for an example of OSD processing by the OSD processing portion 2 included in the display device 100 of FIG. 2, with reference to FIG. 3 and FIG. 4. FIG. 3 is a schematic view explaining an example of OSD processing by the OSD processing portion 2, and FIG. 4 is a flowchart explaining the OSD processing of FIG. 3.

Figure 3:
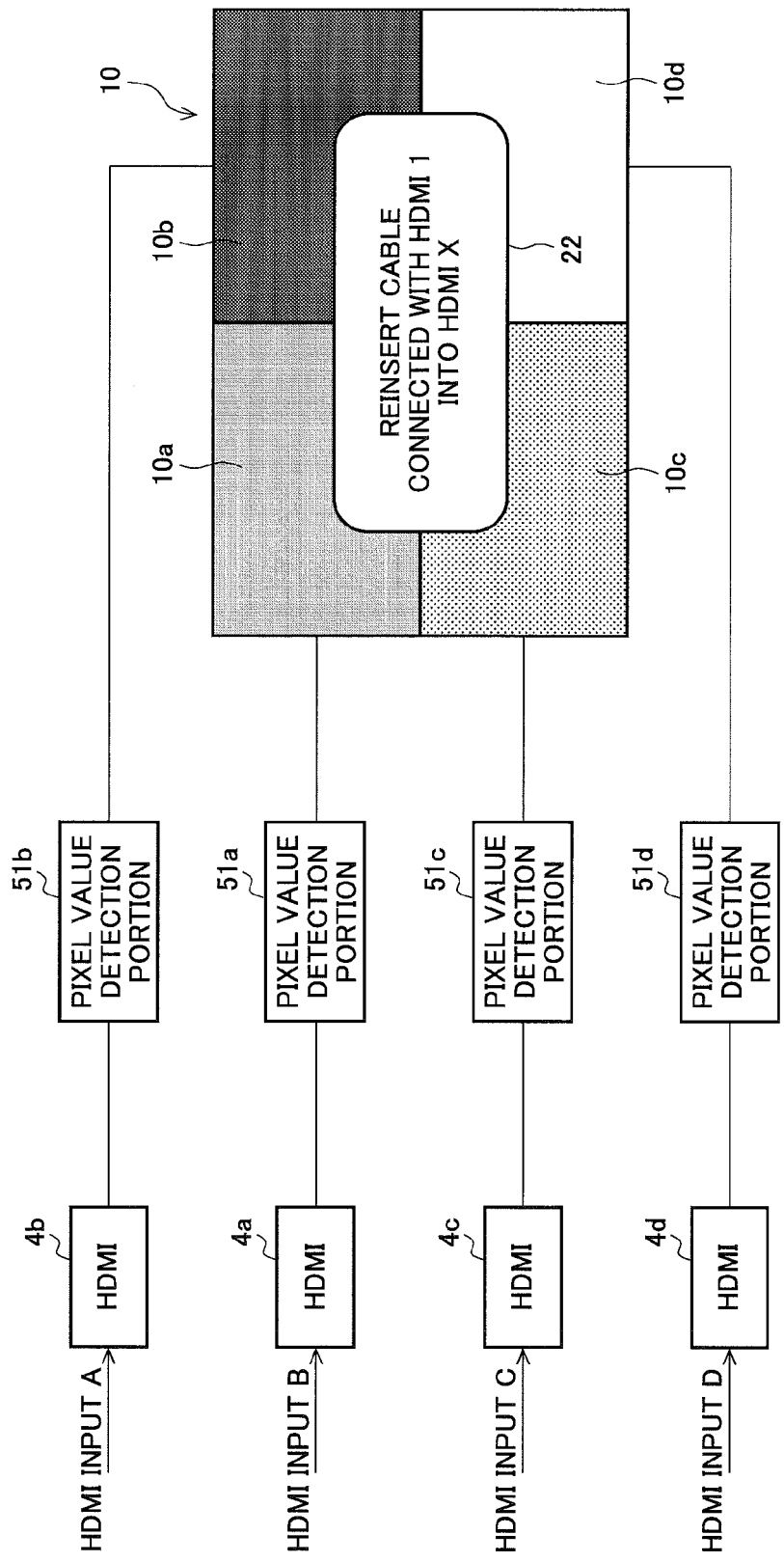
FIG. 3 is a schematic view explaining an example of OSD processing by an OSD processing portion included in the display device of FIG. 2.
Figure 4:
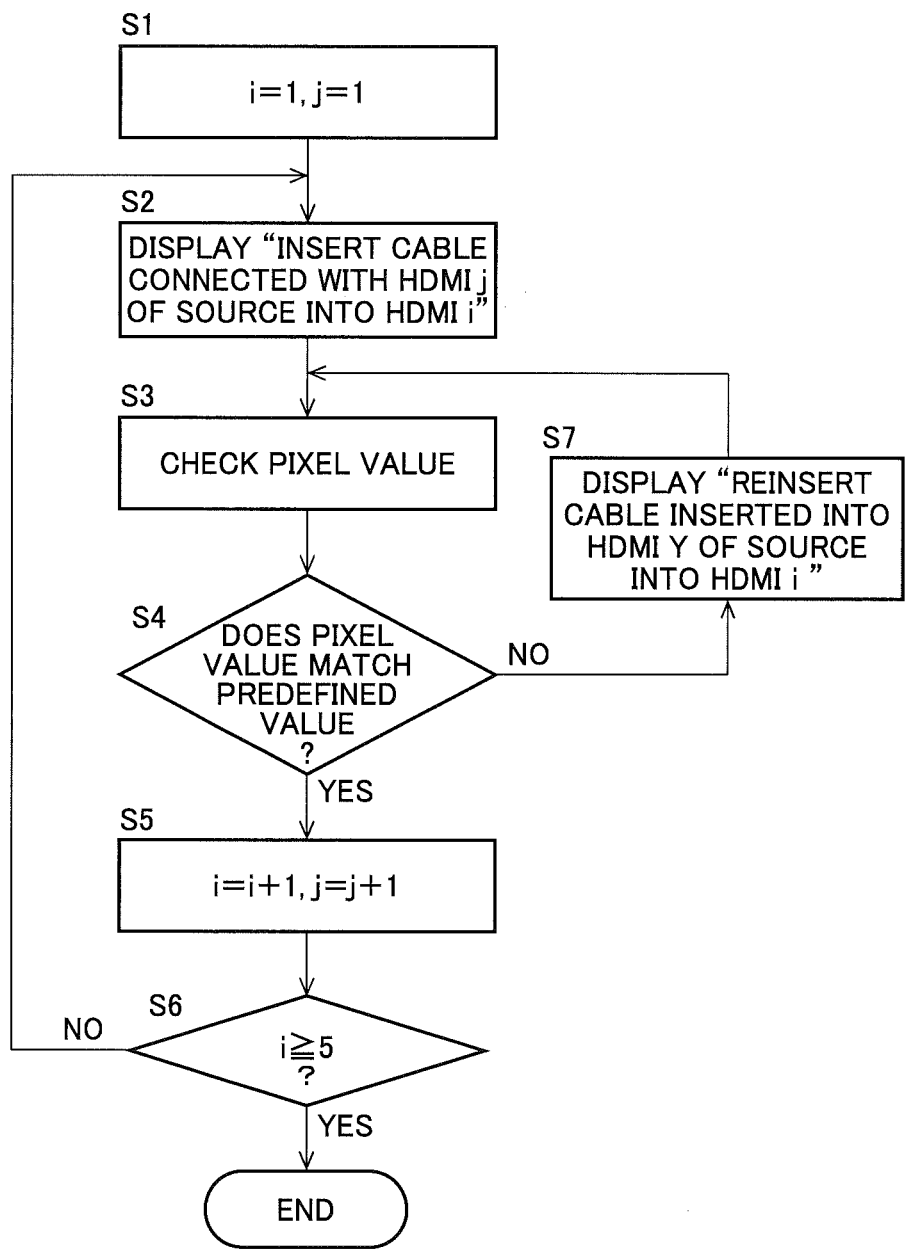
FIG. 4 is a flowchart explaining the OSD processing of FIG. 3.

As exemplified in FIG. 3, the display device 100 having an exemplary configuration described here is provided with four pixel value detection portions 51a to 51d. The pixel value detection portions 51a to 51d are an example of detection portions that detect colors (which may be simply luminance) of test images with respect to respective video signals received via the four HDMI cables from the source device (video signals corresponding to split display areas). The pixel value detection portions 51a to 51d are able to detect pixel values indicated by the video signals which are input through each of the HDMI input terminals 4a to 4d and detect colors indicated by the video signals as a result. By using a solid image as a quarter test image, the same detection result is able to be obtained by detecting with any pixel value of the video signals corresponding to the split display areas. Moreover, in this example, terminals for split display areas 10a to 10d are connected to the HDMI input terminals 4a to 4d via the pixel value detection portions 51a to 51d, respectively.

The OSD processing portion 2 in this exemplary configuration displays a guide image that prompts a user to switch the HDMI cables so that the respective colors detected by the pixel value detection portions 51a to 51d have predetermined arrangement with respect to the received test images, as the above-described OSD image. Therefore, the OSD processing portion 2 receives results of detecting colors of the video signals input through each of the HDMI input terminals 4a to 4d from the pixel value detection portions 51a to 51d, and based on the color detection results, generates the guide image. Here, the above-described predetermined arrangement basically refers to arrangement same as the original 4K2K video serving as an output target in the source device.

In FIG. 3, as such a guide image, a guide image 22 including a message such as "reinsert cable connected with HDMI 1 into HDMI X" is displayed. Note that, here, for example, X of the HDMI X represents arrangement order of the HDMI input terminals 4a to 4d (HDMI connectors) or the like. When a user performs switching in accordance with such a guide image, the 4K2K video that four quarter test images from the HDMI input terminals 4a to 4d are synthesized with the predetermined arrangement is able to be displayed on the display panel 10.

To take a specific example, when the 4K2K test image transmitted on the source device side is split into two uniformly both longitudinally and laterally (into a quad-split square shape) and sent by being split into four, for example, it may be determined such that the upper left is a red solid image, the upper right is a green solid image, the lower left is a blue solid image, and the lower right is a white solid image. Then, it may be such that this arrangement is stored also in the display device 100 which is the receiving side, a color of each of the solid images is detected, and in the case of being different from the arrangement which is stored in advance, a guide image is displayed, and in the case of being the same, display to the effect that cable connection is completed is displayed for a short period of time.

Here, assumed is a case where a video of HDMI input B which is the green solid image is input from the HDMI input terminal 4a, a video of HDMI input A which is the red solid image is input from the HDMI input terminal 4b, a video of HDMI input C which is the blue solid image is input from the HDMI input terminal 4c, and a video of HDMI input D which is the white solid image is input from the HDMI input terminal 4d.

In this case, green, red, blue and white are detected at the pixel value detection portion 51a, the pixel value detection portion 51b, the pixel value detection portion 51c and the pixel value detection portion 51d, respectively, and the OSD processing portion 2 that has received these detection results compares to the above-described predetermined arrangement and displays a guide image that points a part that is not matched.

In this example, since input to the HDMI input terminal 4a and input to the HDMI input terminal 4b are in a state of being exchanged erroneously (reversed), a guide image for exchanging them may be displayed, or a guide image describing such as "reinsert cable connected with HDMI 1 into HDMI 2" like the guide image 22 of FIG. 3 may be displayed. Either guide image is able to prompt a user to switch the HDMI cables so that the split display areas 10a, 10b, 10c and 10d of the display panel 10 become red, green, blue and white solid images, respectively in FIG. 3. In the guide image, procedure till when all switching becomes completed may be described, or display may be performed in order such that only one procedure is shown, and when switching is completed accordingly, OSD processing according to a pixel value detection is executed again and next procedure is shown.

Moreover, by including also a schematic view of arrangement of the HDMI input terminals in the display device 100 to the guide image, it becomes easier to understand which HDMI cable is to be pulled out and where to insert.

Further, the solid images are exemplified with ones which match with a size of the split display area in FIG. 3, but may have only an area whose size is smaller than the split display area, and may have a small area corresponding to, for example, any one or more of an upper end, a lower end, a right end and a left end of the split display area, or any one or more of four corners of the split display area. In this case, a position of the solid image in the quarter test image may be determined in advance and a pixel value of this position may be detected by the pixel value detection portions 51a to 51d.

Moreover, display processing of the OSD image prompting switching as exemplified in FIG. 3 may be performed basically when the HDMI cable is inserted while power is on. However, this is only in a case where it is configured so that the source device 101 of FIG. 1 automatically sends a test image to the display device 100 when display processing of the OSD image prompting switching is executed in the display device 100.

However, the source device 101 is not limited to such device (compatible device) that is configured to send the test image automatically at a time of executing display processing of the OSD image prompting switching in the display device 100. For example, by mounting a disc such as a BD or a DVD having a test image stored therein so as to be readable and performing a user operation for reading the test image in the source device 101, the test image is able to be input to the display device 100. Moreover, by performing a user operation for reading a test image that is stored as a file in a mounted hard disk drive (HDD) or a user operation for reading a test image stored as a file in a server device or the like via a network in the source device 101, the test image is able to be input to the display device 100.

Even when a user operation is performed by any method, this user operation may be executed for the source device 101 when a user completes insertion of HDMI cables while power of the display device 100 is on, or in a state where the power of the display device 100 is turned on after the user completes insertion of HDMI cables, or in a state where the user does not complete insertion of HDMI cables and a state where power of the display device 100 is on. Then, the source device 101 that has received this user operation may provide the display device 100 with a CEC message or an HEC message for executing display processing of the OSD image prompting switching, which is detected by the display device 100, thereby executing this display processing. Alternatively, this display processing is able to be executed also by performing, after this user operation is performed, a predetermined user operation for executing this display processing on the display device 100 side.

Next, description will be given for an example of the OSD processing of FIG. 3, with reference to the flowchart shown in FIG. 4. An example taken here is that, like a question-and-answer method, a user is asked to connect HDMI cables one by one to check whether or not to be suitable according to a color of a test image, which is performed until all HDMI cables are connected correctly.

First, the OSD processing portion 2 sets i indicating ID of the HDMI input terminals 4a to 4d to 1 and sets j indicating ID of an HDMI output terminal of the source device 101 of FIG. 1 to 1 (step S1). Then, the OSD processing portion 2 displays a guide message such as "insert HDMI cable connected with HDMI j of source into HDMI i" (step S2).

Subsequently, the OSD processing portion 2 instructs the pixel value detection portions 51a to 51d to detect a pixel value and the pixel value detection portions 51a to 51d detect a pixel value of a predetermined position of a video signal (or average value of video signal or the like), and the detection result is returned to the OSD processing portion 2 (step S3). The detection result is obtained as a pixel value and it can be said that this pixel value represents a color. Then, the OSD processing portion 2 judges whether or not this pixel value matches a predefined value (for example, value associated with j in advance) (step S4).

When not matching at step S4 (in the case of NO), the OSD processing portion 2 displays a guide image such as "reinsert HDMI cable inserted into HDMI Y of source into HDMI i" (step S7). The procedure returns to step S3 after step S7, and display of step S7 is performed until the pixel value is matched. Here, as to "Y", with the processing of step S4, whether a predefined value for other HDMI input terminal (which is set to be HDMI k. k≠i) matches the pixel value detected at step S3 is also checked to obtain k matching the pixel value detected at step S3, so that this k may serve as Y. Accordingly, even when switching erroneously again after the processing of step S7, a guide image corresponding thereto is able to be displayed.

On the other hand, when matching at step S4 (in the case of YES), i and j are incremented (step S5), and whether or not i≥5 is judged (step S6). In the case of NO at step S6, the procedure returns to step S2, and in the case of YES at step S6, it means that all HDMI cables for a 4K2K video are connected, so that processing is finished.

In this manner, at a stage where YES is given at step S6, the HDMI cables are connected correctly, that is, in the above-described predetermined arrangement, and an original 4K2K test image is to be displayed on the display panel 10 correctly. Accordingly, not only the test image but also a normal 4K2K video are able to be arranged at an appropriate position and displayed correctly.

Next, description will be given for another example of the OSD processing by the OSD processing portion 2 included in the display device 100 of FIG. 2, with reference to FIG. 5. FIG. 5 is a schematic view explaining another example of the OSD processing by the OSD processing portion 2.

Figure 5:
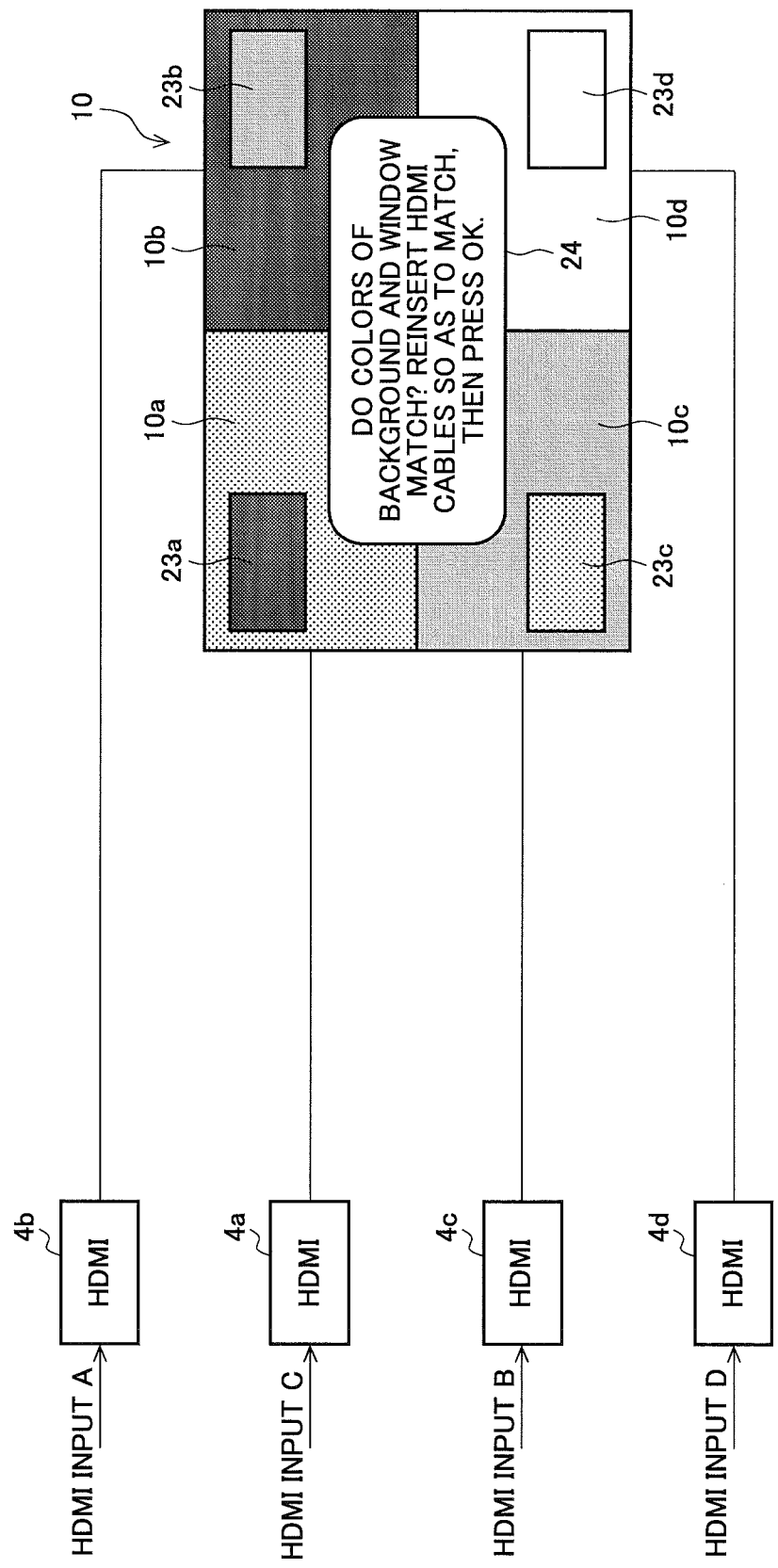
FIG. 5 is a schematic view explaining another example of OSD processing by the OSD processing portion included in the display device of FIG. 2.

The display device having an exemplary configuration described in FIG. 5 does not need the pixel value detection portions 51a to 51d like FIG. 3. The OSD processing portion 2 in this exemplary configuration displays, as the OSD image, images 23a to 23d which are images in colors shown by predetermined arrangement for each of the split display areas 10a to 10d (colors corresponding to split display areas) and smaller than the split display areas. Here, an example that solid images are displayed is taken as a preferable example.

Further, the OSD processing portion 2 in this exemplary configuration displays a guide image 24 as follows as the OSD image. This guide image 24 is an image that prompts a user to switch HDMI cables so that colors of the test images (that is, quarter test images) displayed in the respective split display areas match the colors of the above-described small images.

The guide image 24 in the example of FIG. 5 is such an image that questions whether or not colors of a background and a window (referring to the above-described small solid images 23a to 23d) match and gives an instruction to press OK after reinserting the HDMI cables so as to match. When the HDMI cables are only inserted again, color arrangement of the small solid images 23a to 23d is the same, but the HDMI cables for inputting a video to the split display areas 10a to 10d are changed by inserting again, so that color arrangement of the split display areas 10a to 10d is changed. In a case where the user performs an operation corresponding to OK, when the OSD processing portion 2 receives an operation signal thereof, the OSD processing portion 2 ends display of the OSD image.

To take a specific example, when the 4K2K test image transmitted on the source device side is split into two uniformly both longitudinally and laterally (into a quad-split square shape) and sent by being split into four, for example, it may be determined such that the upper left is a red solid image, the upper right is a green solid image, the lower left is a blue solid image, and the lower right is a white solid image, to prepare in advance so that the solid images 23a to 23d with small areas are displayed as the OSD image in the split display areas 10a to 10d, respectively with corresponding arrangement. Since the OSD image is generated by the OSD processing portion 2, the above-described arrangement may be stored in the OSD processing portion 2 (at least so as to be readable from the OSD processing portion 2).

Here, assumed is a case where a video of HDMI input C which is the blue solid image is input from the HDMI input terminal 4a, a video of HDMI input A which is the red solid image is input from the HDMI input terminal 4*b*, a video of HDMI input B which is the green solid image is input from the HDMI input terminal 4*c*, and a video of HDMI input D which is the white solid image is input from the HDMI input terminal 4*d*.

In this case, the small red solid image 23*a* is superimposed on the blue solid image to be displayed in the split display area 10*a*, the small green solid image 23*b* is superimposed on the red solid image to be displayed in the split display area 10*b*, the small blue solid image 23*c* is superimposed on the green solid image to be displayed in the split display area 10*c*, and the small white solid image 23*d* is superimposed on the white solid image to be displayed in the split display area 10*d*.

In this example, the HDMI cables are connected erroneously except for input to the HDMI input terminal 4*d*. The user is able to recognize it by a difference of the split display areas 10*a* to 10*d* and the small solid images 23*a* to 23*d* and insert the HDMI cables again so as to correct the erroneous connection.

Note that, the solid images displayed in the split display areas 10*a* to 10*d* (solid images in red and the like) are also able to be generated as the OSD image. It may be such that the pixel value detection portions 51*a* to 51*d* detect, from video signals having pixel values indicating, for example, red and the like, the pixel values and provide at least one to the OSD processing portion 2, and the OSD processing portion 2 generates a solid image having a same size with the split display areas with the pixel value and puts a small solid image or a guide image in the solid image, thereby constituting the OSD image to be superimposed.

Moreover, display processing of the OSD image prompting switching as exemplified in FIG. 5 may be performed basically when the HDMI cable is inserted while power is on. However, this is only in a case where it is configured so that the source device 101 of FIG. 1 automatically sends a test image to the display device 100 when display processing of the OSD image prompting switching is executed in the display device 100.

Also in the exemplary configuration of FIG. 5, however, the source device 101 is not limited to such compatible device similarly to the exemplary configuration of FIG. 3, and by performing a user operation for reading a test image that is stored in a disc, an HDD or a server device as well, the test image is able to be input to the display device 100. Even when a user operation is performed by any method, this user operation may be executed for the source device 101 when a user completes insertion of HDMI cables while power of the display device 100 is on, or in a state where the power of the display device 100 is turned on after the user completes insertion of HDMI cables or in a state where the user does not complete insertion of HDMI cables and a state where power of the display device 100 is on. Then, the source device 101 that has received this user operation may provide the display device 100 with a CEC message or an HEC message for executing display processing of the OSD image prompting switching, which is detected by the display device 100, thereby executing this display processing. Alternatively, this display processing is able to be executed also by performing, after this user operation is performed, a predetermined user operation for executing this display processing on the display device 100 side.

Figure 6:
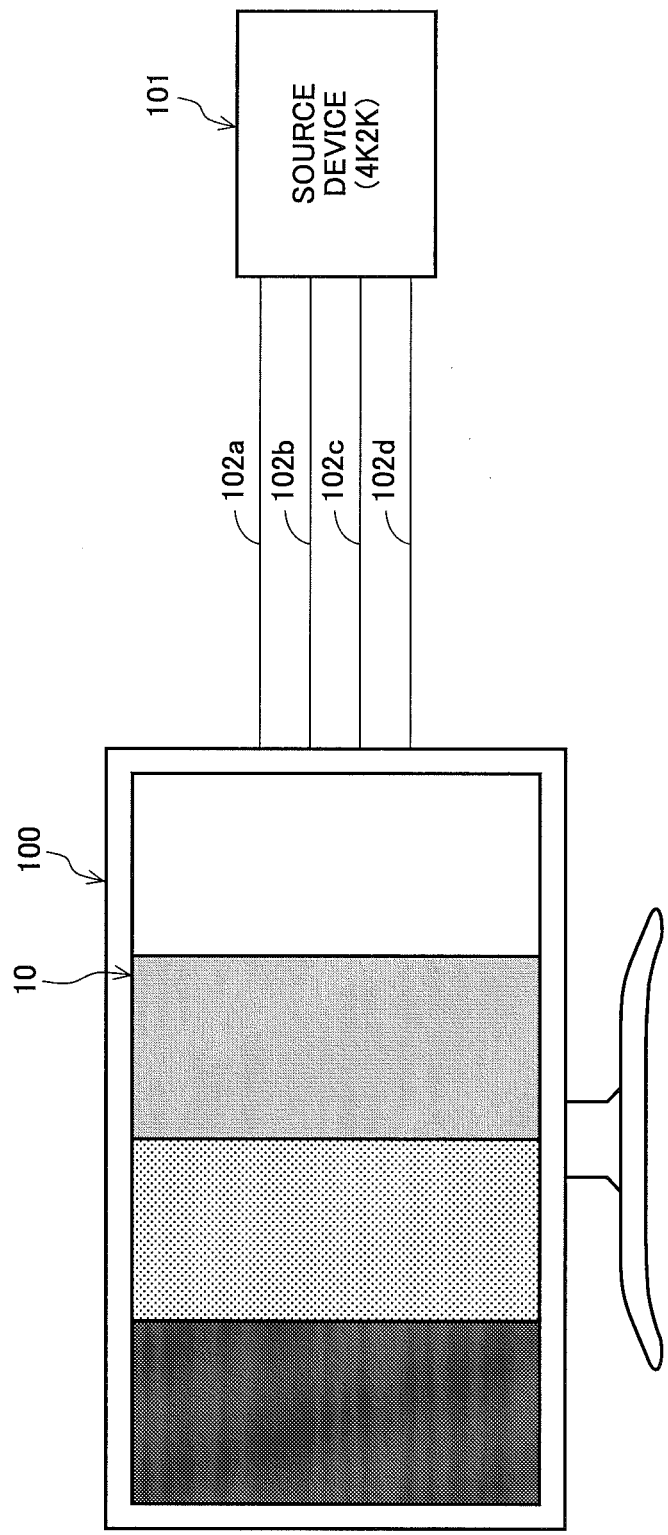
FIG. 6 is a diagram showing an example of a connection form of the display device according to the present invention, which is a diagram explaining screen arrangement different from FIG. 1.

As above, though description has been given in the example with reference to FIG. 1 to FIG. 5 assuming that when a video from the plurality of HDMI cables is split and displayed, display is performed by splitting into four to have a quad-split square shape like FIG. 1 on the screen of the display panel 10, the number of split is of course not limited thereto, and a split method is also not limited thereto. For example, it may be quartered in a comb shape as shown in screen arrangement on the display panel 10 of FIG. 6. Note that, FIG. 6 is a diagram showing an example of a connection form of the display device according to the present invention similarly to FIG. 1, which is a diagram explaining screen arrangement different from FIG. 1.

As described above with reference to FIG. 1 to FIG. 6, according to the display device according to the present invention, in a display device requiring a plurality of HDMI cables to be connected to source device, even if the HDMI cables having a same appearance are used, it is enabled to connect the HDMI cables easily and correctly by display of an easy-to-understand OSD image. Further, according to the present invention, because of corresponding to video transmission with a plurality of HDMI cables, it is possible to correctly execute processing for inputting and reproducing a higher-definition video than FHD, such as 4K2K or ultrahigh-definition which is exemplified. Further, by suggesting rearrangement in HDMI connection by display of an easy-to-understand OSD image on the display device side, even in the case of erroneous connection of the HDMI cables or the like, screen output does not become abnormal to provide normal viewing, so that connection is greatly facilitated. Moreover, since special thing for marking a number in an HDMI cable or changing a color does not need to be prepared, the cost is not increased.

In the description with reference to FIG. 1 to FIG. 6 above, though description has been given so that the number of display areas of the display panel 10 and the number of the HDMI cables are equalized, a transmission bandwidth of the HDMI cable may become wide, for example, by change in the HDMI specification or the like, so that the present invention is not limited thereto. For example, the number of the display areas of the display panel 10 may be larger than that of the HDMI cables or may be smaller to the contrary.

A configuration that the number of the display areas of the display panel is larger than that of the HDMI cables is useful for a case where a video signal generated inside the display device 100 is displayed in the display areas of the display panel 10. For example, it is also possible to display an externally supplied video signal only in a part of the display areas, and display a blue-back video generated inside in other display areas.

On the other hand, a configuration that the number of the display areas of the display panel 10 is smaller than that of the HDMI cables is useful for a case where a part of a video signal supplied from outside of the display device 100 is displayed and a remaining part is displayed by switching of the display areas or the like. For example, it is also possible that a video signal from one HDMI cable is zoom-displayed (enlarged display at all times) in two areas among quartered areas of the display panel 10 of FIG. 1, a video signal from another HDMI cable is displayed in each of the remaining two areas. Moreover, as another example of the case where the number of the display areas of the display panel is smaller than that of the HDMI cables, though assuming that a transmission bandwidth of an HDMI cable is increased, a case where video signals which are able to be supplied by one HDMI cable correspond to a plurality of display areas is cited. In this case, for example, by supplying a video signal for two display areas by one HDMI cable, a 4K2K video signal is able to be transmitted by two HDMI cables.

In this manner, in the display device 100 according to the present invention as exemplified in FIG. 2, when the OSD processing portion 2 receives a plurality of video signals, which show a test image having different colors respectively in split display areas formed by splitting a display area of the display panel 10 to have a predetermined number different from the number of the HDMI cables, from the source device via the plurality of cables, an OSD image that prompts a user to switch the HDMI cables may be displayed on the display panel 10 according to the received test image.

Finally, description will be given supplementally for a configuration for performing multi-screen display in a display device. A display device that performs multi-screen (multi-window) display by inputting a video from a single source device is different from each of the exemplary configurations described above mainly in terms of that the number of HDMI terminals is different. In this case, as long as colors are avoided to be overlapped in all partial test images, the display processing of an OSD image prompting switching described above may be performed for each one window or the display processing described above may be performed collectively for all windows. Further, a display device that performs multi-screen display by inputting a video from a plurality of source device is different from each of the exemplary configurations described above mainly in terms of that the number of HDMI terminals is different and that a test image needs to be determined and registered in advance with respect to source device. Other applications and effect thereof are basically similar to the exemplary configurations described with reference to FIG. 1 to FIG. 6.

EXPLANATIONS OF LETTERS OR NUMERALS

1 . . . control portion, 2 . . . OSD processing portion, 3 . . . OSD conversion portion, 4a, 4b, 4c and 4d . . . HDMI input terminal, 5 . . . multi-window control portion, 6 . . . upscaling portion, 7 . . . image quality correction portion, 8 . . . FRC portion, 9 . . . timing generation portion, 10 . . . display panel, 10a, 10b, 10c and 10d . . . split display area, 11 . . . main SoC, 12 . . . USB terminal, 13 . . . Ethernet connection terminal, 14 . . . WiFi communication device, 15 . . . HDMI input terminal, 16 . . . tuner, 17 . . . SATA interface, 21 . . . sub SoC, 22 and 24 . . . guide image, 23a, 23b, 23c and 23d . . . small solid image, 51a, 51b, 51c and 51d . . . pixel value detection portion, 100 . . . display device, 101 . . . source device, and 102a, 102b, 102c and 102d . . . HDMI cable.

The invention claimed is:

1. A display device comprising:
one display panel and
a plurality of input terminals for inputting a divided video signal for a video to be displayed on the display panel in which the divided video signal is divided among a plurality of cables,
wherein the display device is configured to be connected to source device for outputting the divided video signal of the video to be displayed on the display panel with the plurality of cables,
the display device further comprising
an OSD processing portion that, when receiving a plurality of video signals for a test image as the divided video signal from the source device via each of the plurality of cables, splitting a display area of the display panel so as to have the same number of display areas as the number of cables and providing the test image as different colors for respective split display areas, causes the display panel to display an OSD image that prompts a user to switch the cables to be connected to different said input terminals according to the received test image.

2. The display device according to claim 1, further comprising
a detection portion that detects a color of the test image for each of the video signals received via the plurality of cables from the source device, wherein
the OSD processing portion displays, as the OSD image, a guide image that prompts the user to switch the cables in such a manner that each color detected by the detection portion has predetermined arrangement with respect to the received test image.

3. The display device according to claim 1, wherein
the OSD processing portion displays, as the OSD image, an image that has a color indicated by predetermined arrangement and is smaller than the split display area in each of the split display areas, and a guide image that prompts the user to switch the cables so that a color of the test image and a color of the small image, which are displayed in each of the split display areas, are matched.

4. The display device according to claim 1, wherein
the cables are HDMI cables and the input terminals are HDMI input terminals.

5. The display device according to claim 2, wherein
the cables are HDMI cables and the input terminals are HDMI input terminals.

6. The display device according to claim 3, wherein
the cables are HDMI cables and the input terminals are HDMI input terminals.

* * * * *